June 17, 1930.  J. M. COOK  1,764,606
MATERIAL WORKING APPARATUS
Filed June 8, 1927  2 Sheets-Sheet 1
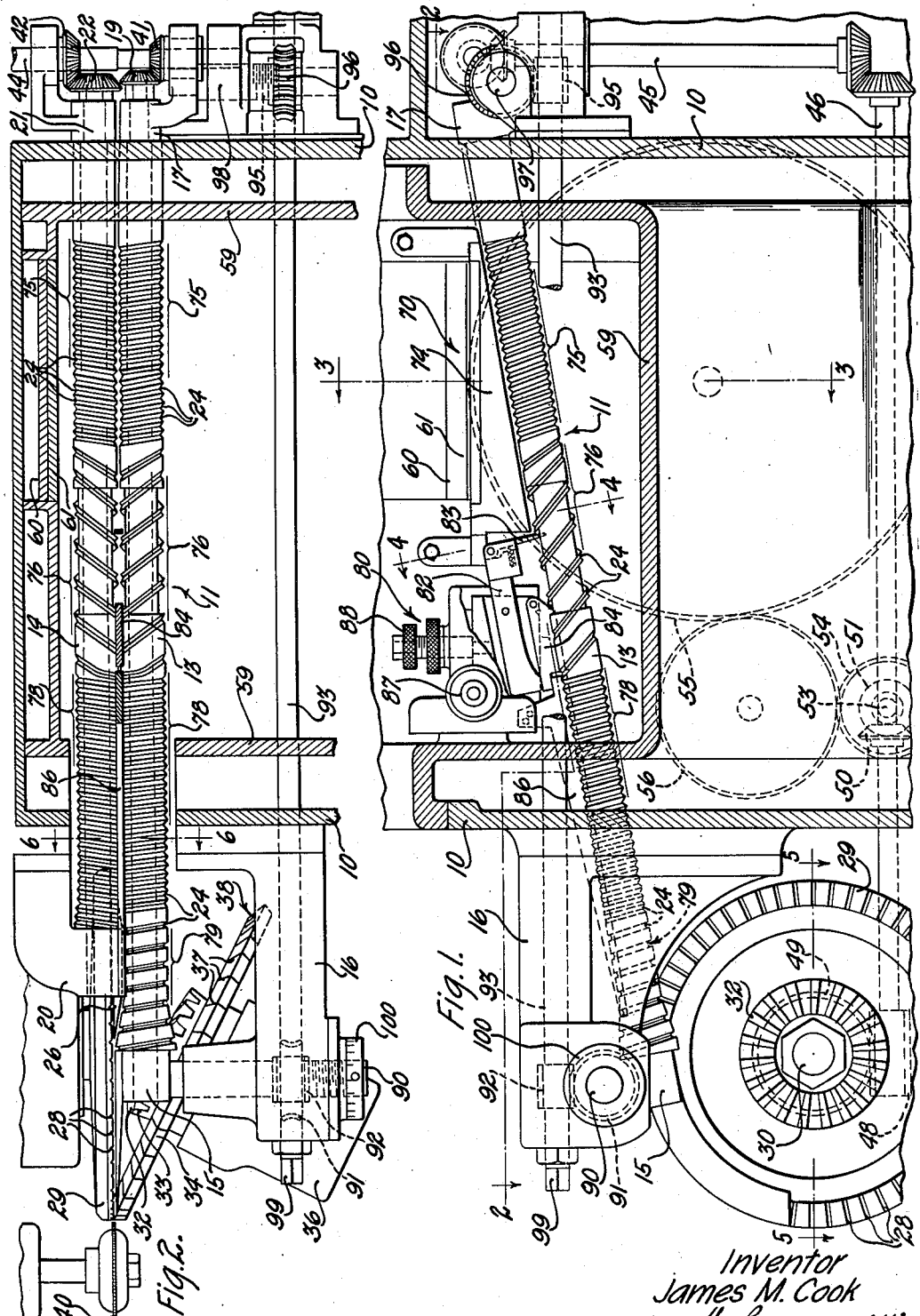
Inventor
James M. Cook
by (signature) Att'y.

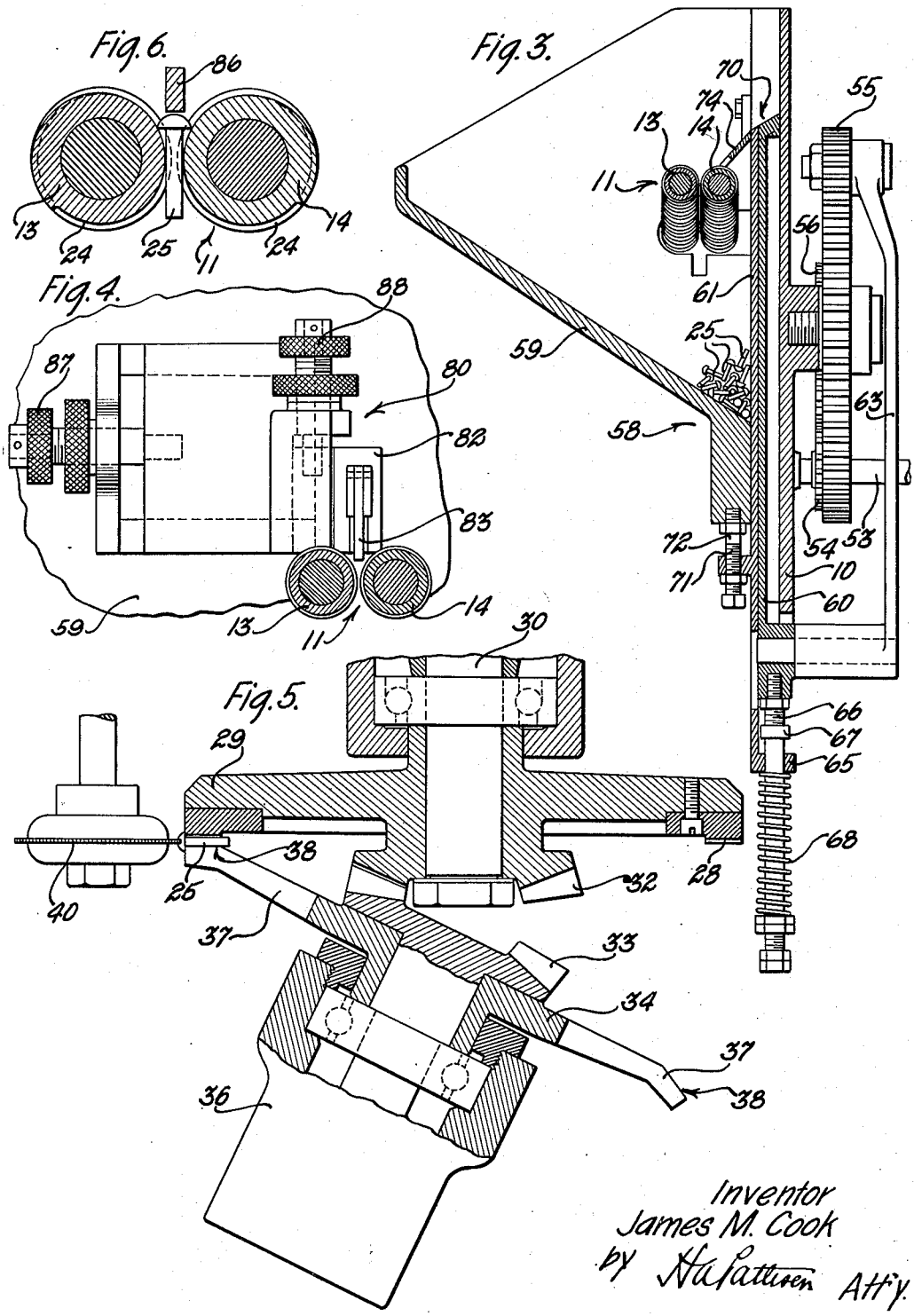

Patented June 17, 1930

1,764,606

UNITED STATES PATENT OFFICE

JAMES MILTON COOK, OF LA GRANGE, ILLINOIS, ASSIGNOR TO WESTERN ELECTRIC COMPANY, INCORPORATED, OF NEW YORK, N. Y., A CORPORATION OF NEW YORK

MATERIAL-WORKING APPARATUS

Application filed June 8, 1927. Serial No. 197,957.

This invention relates to material working apparatus, and more particularly to apparatus for slotting screw blanks continuously fed from an indiscriminately arranged supply thereof.

The primary object of this invention is to provide a simple and durable apparatus for expeditiously working blanks.

In accordance with the general features of the invention, one embodiment thereof constituting a screw slotting apparatus consists of a screw mechanism provided with spiral ways for receiving blanks indiscriminately associated therewith by a reciprocating feeding device. Blanks which are properly positioned within the ways are advanced to a storage portion of the screw mechanism and subsequently fed individually in a predetermined spaced relation to a conveyor disk. An angularly disposed disk yieldingly clamps the blanks against the conveyor disk as they are subjected in successive order to a slotting operation.

These and other objects will be more apparent from the following detail description and accompanying drawings, wherein Fig. 1 is a vertical sectional view of a portion of a slotting machine representing one embodiment of the invention, the clamping disk being removed for purposes of disclosing parts otherwise hidden;

Fig. 2 is a fragmentary section in plan taken on the line 2—2 of Fig. 1 and showing the slotting saw;

Fig. 3 is a transverse vertical section of the hopper and feed mechanism taken on the line 3—3 of Fig. 1;

Fig. 4 is a sectional view taken transversely of the screw mechanism on the line 4—4 of Fig. 1 disclosing the stop mechanism;

Fig. 5 is a horizontal sectional view of the conveyor and clamping disks taken on the line 5—5 of Fig. 1, and Fig. 6 is a detailed sectional view taken transversely of the screw mechanism on the line 6—6 of Fig. 2, disclosing a screw blank properly positioned within the spiral way.

Referring now to the drawings wherein like numerals have been employed to designate similar parts throughout the various figures, it will be observed that Figs. 1 and 2 disclose a machine frame 10, and extending through the machine frame is a screw mechanism noted generally by the numeral 11, which comprises a pair of parallel screws 13 and 14 inclined from the horizontal. A bearing 15 mounted upon a frame arm 16 suitably secured to the frame 10 serves as a support for the lower extremity of the screw 13, and a bearing 17 supports the upper extremity of the screw 13 which carries a bevel gear 19. The screw 14 which is shorter than the screw 13 is supported at its lower extremity in a bearing 20, the upper extremity thereof terminating in a bearing 21 and supporting a bevel gear 22. Each of the screws 13 and 14 is provided with a continuous spiral way 24, the spiral way or thread of one screw having the same relative position as the spiral way in the other screw so as to permit the advancement of a screw blank 25 (Fig. 6) when properly positioned between the screws as shown in Fig. 6. The lower extremity of the screw 13 extends beyond the screw 14 and is enlarged so as to convey a properly positioned screw blank along a path adjacent to a guide 26 (Fig. 2) secured beneath the bearing 20 into association with one of a plurality of notches 28 provided in a rotatable conveyor disk 29.

This conveyor disk 29 is secured to a shaft 30 (Figs. 1, 2, and 5) and the central portion of the conveyor disk 29 is formed with a bevel gear 32 which meshes with and drives a companion bevel gear 33 which is rotatable with a clamping disk 34 angularly positioned with respect to the conveyor disk 29. This clamping disk 34 is rotatable within a suitable bearing 36 and is provided with a plurality of radial saw slots 37 formed around the margin thereof. The saw slots 37 divide the disk 34 into a plurality of radial arms having clamping surfaces 38 (Fig. 5) and render the margin of the disk 34 sufficiently resilient so that when a clamping surface engages the shank of a screw blank 25 carried within a notch 28 of the conveyor disk 29, it will clamp the blank as the head thereof is carried into association with a forming member or slotting saw 40. This slotting saw is continuously rotated by means of an electric motor (not shown) or other suitable driving device and the yielding grip of the disk 34 upon the screw blank 25 insures the formation of clean, uniform cuts in the blank heads as they are successively moved past the saw 40.

Referring to Figs. 1 and 2, it will be observed that rotation in opposite direction is imparted to the screws 13 and 14 by a pair of bevel gears 41 and 42 meshing with the gears 19 and 22, respectively, the gear 41 being slidably keyed and the gear 42 fixed to a horizontally disposed shaft 44 which has a bevel gear connection at its rearward extremity with a vertical shaft 45. The lower extremity of the shaft 45 has a geared connection with one extremity of a horizontal shaft 46 (Fig. 1), the other extremity thereof having a worm 48 which engages a worm wheel 49 keyed to the shaft 30. A bevel gear 50 (Fig. 1) secured to the shaft 46 meshes with a companion gear 51 mounted upon one end of a main drive shaft 53 which carries a gear 54 (Figs. 1 and 3). The drive shaft 53 is connected at its opposite extremity to a suitable driving mechanism (not shown). The gear 54 serves to drive a large gear 55 through an intermediate gear 56, the gear 55 serving as the driving medium of a screw blank feeding mechanism denoted generally by the numeral 58 (Fig. 3).

This blank feeding mechanism 58 comprises a hopper 59 which is suitably supported upon the machine frame 10. The bottom of the hopper 59 inclines downwardly toward the rear thereof, and positioned at the rear side of the hopper is a pair of reciprocable feeding members 60 and 61 vertically slidable within the hopper. Vertical reciprocation is imparted to the feed member 60 through the action of an arm 63 (Fig. 3), one end of which is pivotally connected with the lower end of the feed member 60, the other end having a pivotal connection with the marginal portion of the face of the gear 55. The lower extremity of the reciprocable feed member 61 is provided with a projection or lug 65 which is slidable upon a vertical pin 66 threaded to the lower extremity of the feed member 60. It will be observed that as the feed member 60 begins its downward movement from its uppermost position shown in Fig. 3, the member 61 will not be moved until a collar 67 carried by the pin 66 engages the projection or lug 65. Upon the engagement of the collar 67 with the lug 65 the feed member 61 begins to move downwardly against a coil spring 68 carried by the pin 66. Thus when the members 60 and 61 reach their lowermost position with their upper extremities immediately below the lowermost portion of the hopper 59, an upper inclined surface 70 of the feed member 60 will have assumed a position below that of the upper end of the feed member 61, thereby presenting a channel or pocket into which screw blanks from the hopper 59 will be deposited by the action of gravity. As the members 60 and 61 are moved upwardly as a unit with the spring 68 pressing against the lug 65, the above mentioned channel or pocket will be maintained until the upper portion of their movement has been reached. At this point a stop screw 71 carried by the feed member 61 engages a stop screw 72 secured to the hopper 59 which prevents further movement of the member 61 and the feed member 60 continues to move upwardly a short distance until the upper surface 70 thereof is carried into alignment with the upper surface of the member 61. Screw blanks resting upon the inclined surface 70 will then be carried by gravity over a hinged guide plate 74 and subsequently deposited in indiscriminate order between the screws 13 and 14 of the mechanism 11. From the foregoing it will be clear that the feed mechanism serves to continuously supply screw blanks to the screw mechanism 11 and any blanks which may be thrown from the screw mechanism will fall back into the hopper.

The spiral ways in a section of the screws 13 and 14 denoted by the numeral 75 upon which the screw blanks are deposited by the feed members 60 and 61 have a comparatively small pitch so as to effect a relatively slow advancement of the deposited blanks. When the blanks reach the end of this section 75, their speed of advancement is greatly increased by reason of the increased pitch of the way 24 in a section thereof denoted by the numeral 76. In this section 76 the screws 13 and 14 are cut away so as to permit any improperly positioned blanks resting upon the screws to pass downwardly therebetween and be precipitated into the blank supply within the hopper. From the section 76 of the way 24 the screws are carried into a section 78 thereof, the pitch of the ways in this section being similar to the pitch of the ways in section 75. Section 78 serves to store the properly positioned screw blanks before they are advanced by a section 79, the pitch of the ways in this latter section being such as to space the advanced screw blanks in accordance with the spacing of the notches 28 in the conveyor member or disk 29. Thus it will be understood that as the blanks are advanced from the storage section 78 of the ways 24 they will be spaced in a predetermined order in the section 79 and successively delivered to the notches 28 as they move past the lower extremity of the screw member 13.

In order to prevent a continuous advancement of the screw blanks within the section 76 of the ways 24 after the storage section 78 has been completely filled, a stop mechanism 80 (Figs. 1 and 4) is provided which is suitably secured to the inner wall of the hopper 59. This mechanism 80 includes a pivoted finger 82 having at its forward outer extremity a depending tip 83 which is adapted when swung downwardly through the action of a pivoted guard 84 engaging the opposite extremity of the finger 82 to obstruct the advancement of screw blanks and cause the same to be dislodged from the ways 24. The downward swinging of the tip 83 is only occasioned when the blanks completely fill the sections 79 and 78 at which time the blanks will be backed upwardly against the lower edge of the guard 84. Extending between the screw members 13 and 14 at the described lower portion thereof is a fixed guard member 86 which occupies a position immediately above the heads of the screw blanks being advanced within the sections 78 and 79, thereby precluding the upward displacement of the advancing blanks. This guard 86 terminates at its uppermost end adjacent the pivoted guard 84 and serves to limit the downward swing of the guard 84. Obviously when the section 78 of the way 24 is not completely filled, blanks will be advanced in normal position beneath the guard 84 and the finger 83 of the stop mechanism will occupy its uppermost position as shown in Fig. 1. The stop mechanism 80 is provided with a pair of adjusting thumb screws 87 and 88, the screw 87 serving to adjust the lateral alignment of the guards 84 and 86, and the finger 83 with respect to the screws 13 and 14. The adjusting screw 88 serves to adjust the vertical position of the guards 84 and 86 and the finger tip 83.

Means is provided for adjusting the lateral position of the screw 13 with respect to the screw 14 which includes a shaft 90 extending transversely of and threaded within the machine frame arm 16 which supports the screw bearing 15 at its inner extremity. The shaft 90 supports a worm wheel 91 which engages a companion worm 92 carried by a horizontally disposed shaft 93. This shaft 93 is provided with a similar worm 95 at its opposite extremity which engages a companion worm wheel 96 mounted upon a shaft 97 threaded within a frame bracket 98. The inner extremity of this shaft 97 supports the screw bearing 17 and operates upon rotation to laterally adjust the screw 13. Thus it will be clear that upon engaging and turning a squared end 99 of the shaft 93 by means of any suitable wrench, the lateral adjustment of the screw 13 with respect to its companion screw 14 may be readily obtained. A graduated member 100 carried by the shaft 90 serves to indicate the degree of lateral displacement of the screw 13.

In the operation of the apparatus the screw blanks are placed within the hopper 59 and rotation is imparted to the main drive shaft 53. The reciprocation of the feed members 60 and 61 causes blanks to be continuously supplied to the screw mechanism 11 and certain of the deposited blanks become properly lodged between the ways 24 in the section 75. The pitch of the spiral ways in the section 75 enables blanks which are deposited in indiscriminate order thereon, readily to become properly positioned and advanced in close proximity within the ways. From the section 75 the blanks are steadily advanced to the section 76 wherein improperly positioned blanks are returned to the hopper, and from this section the properly positioned blanks are advanced to the storage section 78. In the storage section 78, the properly positioned blanks are again arranged in close proximity as in section 75 and by this arrangement of the spiral ways a supply of blanks will always be in readiness to be advanced in spaced relation by the section 79. From the storage section 78 individual blanks are quickly advanced in a predetermined spaced relation by the section 79 and individually delivered to the notches 28 provided in the conveyor disks 29. It will be clear that by having the spiral ways 24 arranged in the manner described, the notches 28 will be supplied without interruption with screw blanks as they pass the lower extremity of the way and hence the conveyor disk 29 will operate at its maximum efficiency. The blanks in the notches 28 are successively carried into clamping relation with the clamping disk 34 which operates to firmly hold a blank in proper position as it is carried past the slotting saw 40, the blank being subsequently released and deposited by gravity into a suitable receiving tray (not shown). The apparatus just described is very compact in design and very efficient in operation, and by employing such an apparatus the production of slots in screw blanks is greatly accelerated.

What is claimed is:

1. In apparatus for working blanks, a blank working means, means for successively delivering blanks to the working means at predetermined intervals, and a rotatable screw mechanism having a spiral way for advancing associated blanks in a pre-determined spaced relation to successively present individual blanks directly to the delivering means at proper predetermined intervals.

2. In apparatus for working blanks, a blank working means, means for successively delivering blanks to the working means at predetermined intervals, a screw mechanism having a spiral way for advancing blanks from a supply thereof, storing properly positioned blanks and advancing stored blanks in a predetermined spaced relation to successively present individual blanks to the delivering means at proper predetermined intervals.

3. In apparatus for working blanks, a blank working means, means for successively delivering blanks to the working means at predetermined intervals, a screw mechanism having a spiral way for advancing blanks from a supply thereof, storing properly positioned blanks and advancing stored blanks in a predetermined spaced relation to successively present individual blanks to the delivering means, and means for retarding the advancement of blanks when a predetermined supply of blanks have been stored.

4. In apparatus for working blanks, a blank working means, means for successively delivering blanks to the working means at predetermined intervals, a screw mechanism having a spiral way for receiving blanks indiscriminately associated therewith and for advancing properly positioned blanks in a predetermined spaced relation to successively present individual blanks directly to the delivering means at proper predetermined intervals, and means for associating blanks with the spiral way.

5. In apparatus for forming blanks, a forming means, rotary means for successively associating blanks with the forming means, and a screw mechanism operable in timed relation with the rotary means having a spiral way for advancing blanks in proper predetermined spaced relation to deliver individual blanks successively to the rotary means.

6. In apparatus for forming screw blanks, a forming means, means for receiving and successively advancing blanks into association with the forming means, means for delivering blanks to the receiving means, and a rotary clamping member angularly disposed with respect to the advancing means for yieldingly clamping a blank in position during the association thereof with the forming means.

7. In apparatus for forming screw blanks, a forming means, rotary means for receiving and successively advancing blanks into association with the forming means, and a rotary clamping member having resilient radially extending portions for yieldingly and individually engaging blanks during the association thereof with the forming means.

8. In apparatus for forming screw blanks, a slotting cutter, a rotatable disk member provided with a plurality of marginal blank receiving recesses for advancing blanks into association with the cutter, means for feeding blanks to the recesses in the disk member, and a companion angularly disposed rotatable disk for yieldingly clamping a blank within a recess during the association thereof with the cutter.

9. In apparatus for forming screw blanks, a slotting cutter, a rotatable disk member for advancing blanks into association with the cutter, means for feeding blanks to the rotatable disk member, and a cooperating clamping disk member provided with a plurality of resilient, radially extending arms.

10. In apparatus for forming screw blanks, a rotary member having recesses for receiving blanks, a rotary clamping member having radially extending resilient members adapted to successively engage the blanks positioned in the recesses to prevent displacement thereof relative to the recesses, and means for successively forming the blanks engaged by the resilient members.

11. In blank forming apparatus, a continuously rotating member adapted to receive blanks, a clamping member rotating at the same speed as the rotating member and having resilient members adapted to successively engage the blanks received by the rotating member to prevent relative movement between the blanks and the rotating member, and means for successively forming the blanks engaged by the resilient members.

12. In blank forming apparatus, a slotting means, a rotary member adapted to advance blanks to the slotting means, and a plurality of resilient members rotating at the same speed as said rotary member and yieldingly bearing thereagainst to successively and individually clamp the blanks being slotted by the slotting means.

13. In blank forming apparatus, a forming means, rotary means for successively advancing blanks into association with the forming means, and a plurality of yielding members rotatably mounted in a plane inclined to the plane of rotation of the advancing means and each adapted to cooperate with the advancing means to yieldingly clamp a blank in position during the association thereof with the forming means.

14. In blank forming apparatus, a forming means, a rotary member having radial recesses for receiving and successively advancing blanks into association with the forming means, and a rotary member having resilient radial portions cooperating with the recesses of the first mentioned member to individually and yieldingly clamp the blanks during their association with the forming means.

In witness whereof, I hereunto subscribe my name this 28th day of May, A. D. 1927.

JAMES MILTON COOK.